Aug. 6, 1963 H. LANE ETAL 3,099,846
PULLING AND LASTING MACHINES
Filed March 19, 1962 13 Sheets-Sheet 8

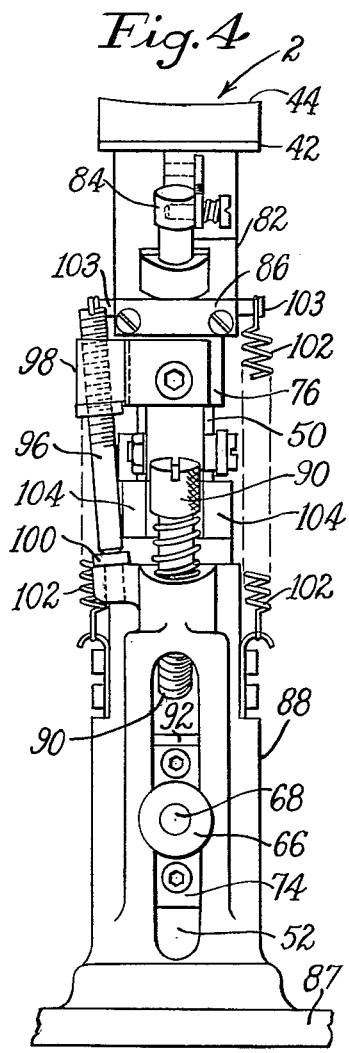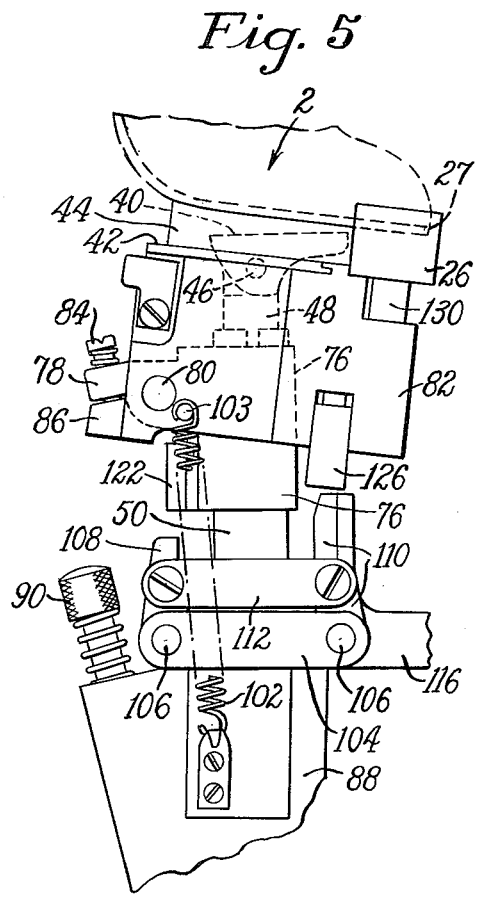

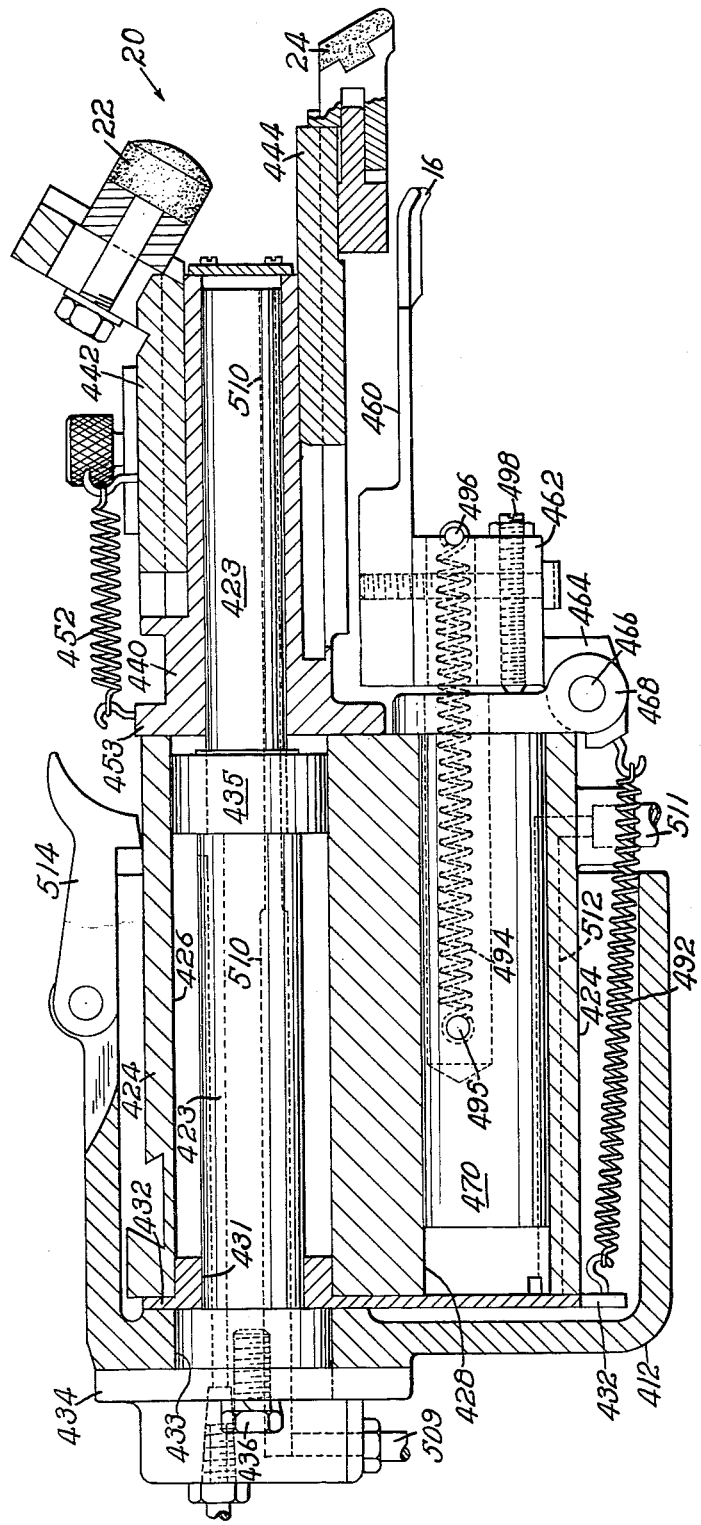

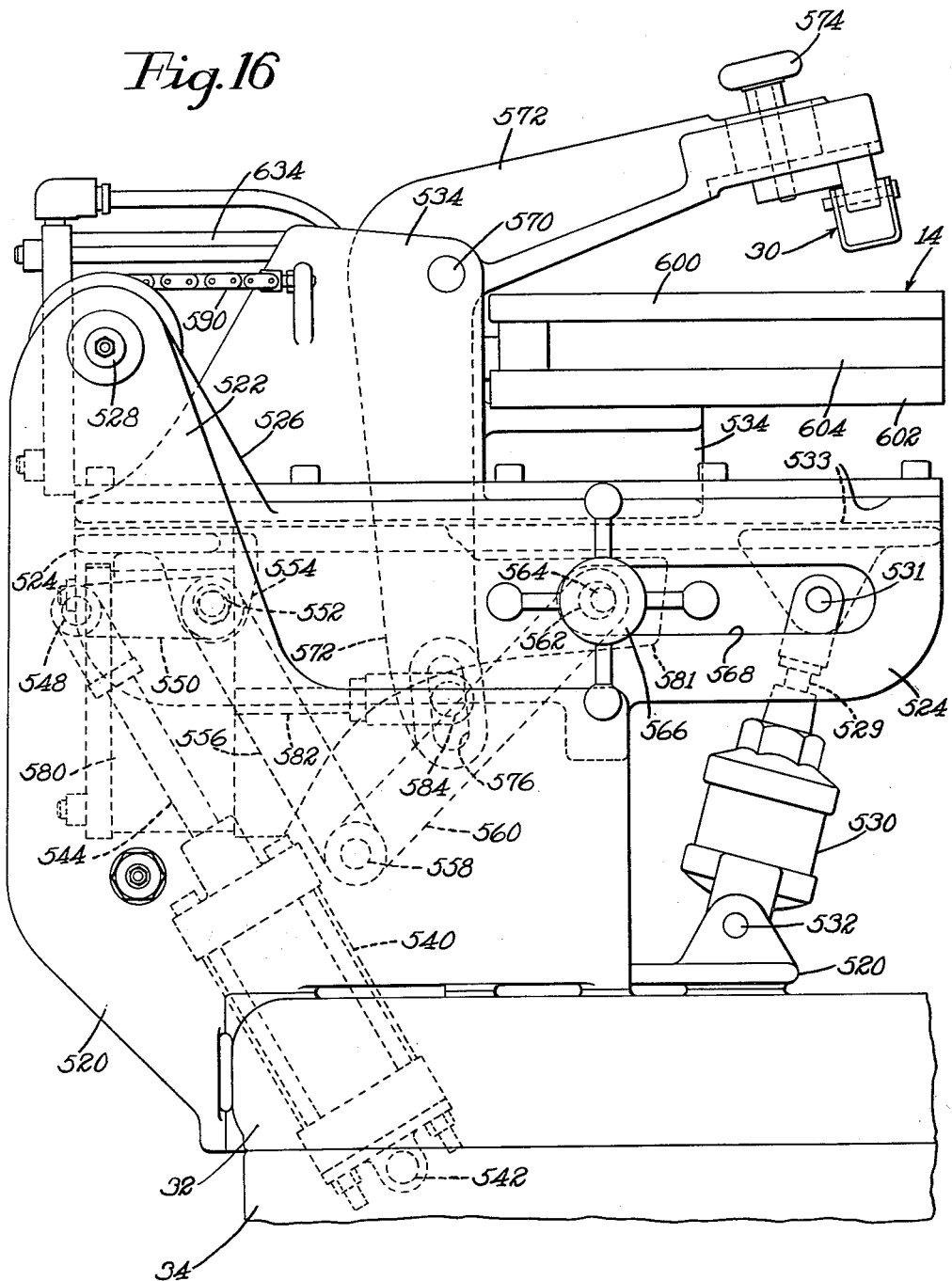

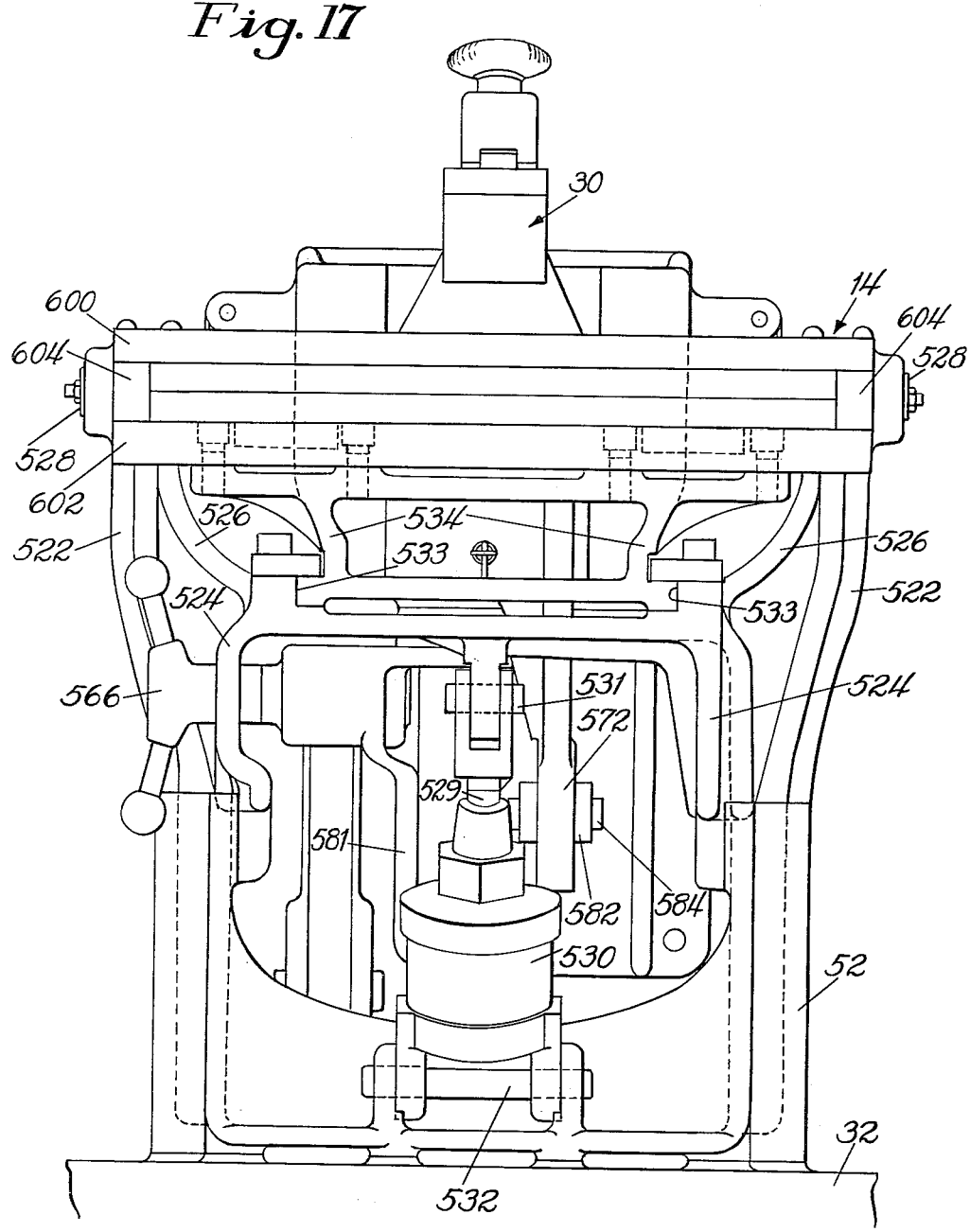

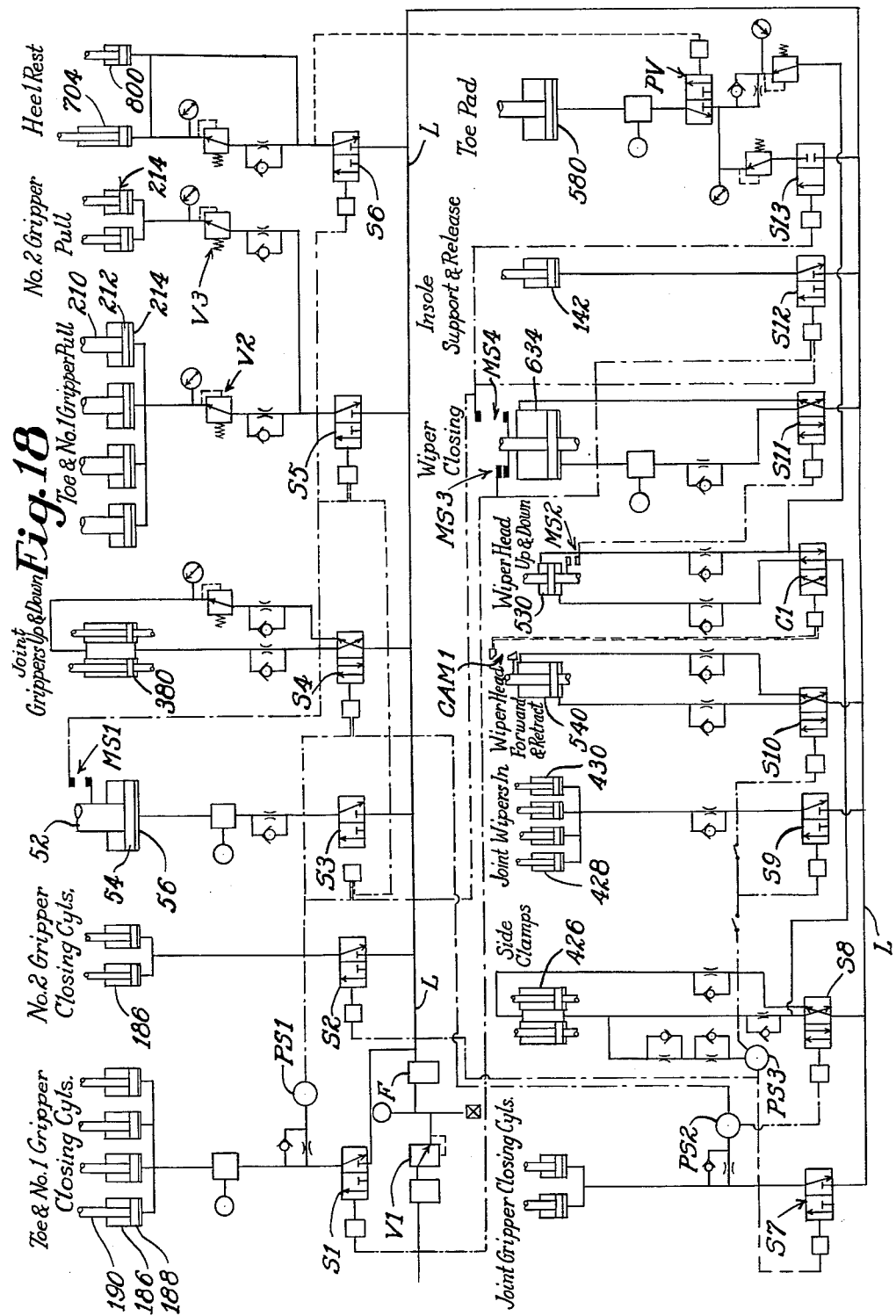

United States Patent Office 3,099,846
Patented Aug. 6, 1963

3,099,846
PULLING AND LASTING MACHINES
Harold Lane, John W. Pratt, and Robert C. Quarmby, Leicester, England, assignors to United Shoe Machinery Corporation, Boston, Mass., a corporation of New Jersey
Filed Mar. 19, 1962, Ser. No. 180,498
Claims priority, application Great Britain Mar. 22, 1961
7 Claims. (Cl. 12—10.1)

This invention relates generally to shoe upper forming machines and, more particularly, is directed to a machine for performing a pulling over and lasting operation in the toe, forepart and ball regions of a shoe.

Lasting machines heretofore available generally have been constructed to operate specially on a particular portion of a shoe. Certain lasting machines have been developed recently to combine the lasting operations on several portions of the shoe in a single machine. Such machines, however, have been complex and expensive.

Accordingly it is a general object of the invention to provide a relatively simple machine for combining the lasting operations on the forepart and the ball portions of a shoe. To this end the machine is provided with a plurality of grippers arranged to pull an upper about the toe and forepart of a last on which the upper is assembled and with wipers adapted to wipe the pulled upper inwardly over the forepart of an insole for attachment thereto. The machine is also provided with a pair of lasting units arranged to operate at opposite sides of the shoe at the ball portion.

Generally it is more advantageous to complete the lasting operation at the ball regions of the shoe before the forepart of the upper is lasted. However, this sequence of operations often causes wrinkles to be formed in the area between the forepart and the ball region where neither the forepart wipers nor the ball wipers engage the shoe. To avoid this situation the forepart wipers are elongated to overlap the portions of the shoe operated upon by the joint wipers. Since the ball wipers would interfere with the operation of the forepart wipers, machines heretofore available have been provided with rather complex and intricately timed mechanisms to move the ball wipers out of the plane of operation of the forepart wipers.

According to one feature of the present invention, the heel end portions of the forepart wipers in their downwiping positions are arranged to overlie the most toeward portions of the ball wipers. The ball wipers are yieldable heightwise of the shoe bottom so that, during their downwiping movement, the forepart wipers engage and depress the ball wipers, control of the upper then passing to the forepart wipers. In this manner intricate timing and complex mechanisms are completely avoided.

According to another feature the machine is provided with a pair of wiping units adapted to operate at opposite sides of the last at the ball regions. Each unit includes a wiper arranged to wipe the upper over the last bottom at the ball line, an additional wiper is provided to wipe the upper along the last bottom region extending heightwise from the ball region toward the heel end. This additional wiper is adjustable so as to conform substantially to the lengthwise contour of the last bottom which varies greatly according to the heel height of the last.

The above and other features of the invention, together with novel combinations and details of construction, will now be described with particular reference to the drawings and thereafter particularly pointed out in the appended claims.

In the drawings,

FIG. 4 is a front view of parts shown in FIG. 3;

FIG. 5 is a view similar to portions of FIG. 3 but with certain of the parts in positions which they may occupy prior to the commencement of a cycle of operations of the machine;

FIG. 12 is a section substantially on line XII—XII of FIG. 11;

FIG. 16 is a left side view of the main wiper assembly, a toe rest, and mechanism for operating these parts;

FIG. 17 is a front view of parts seen in FIG. 16; and

FIG. 18 is a schematic diagram of pneumatic operating means of the machine and of associated electrical controlling devices.

Figure 2:
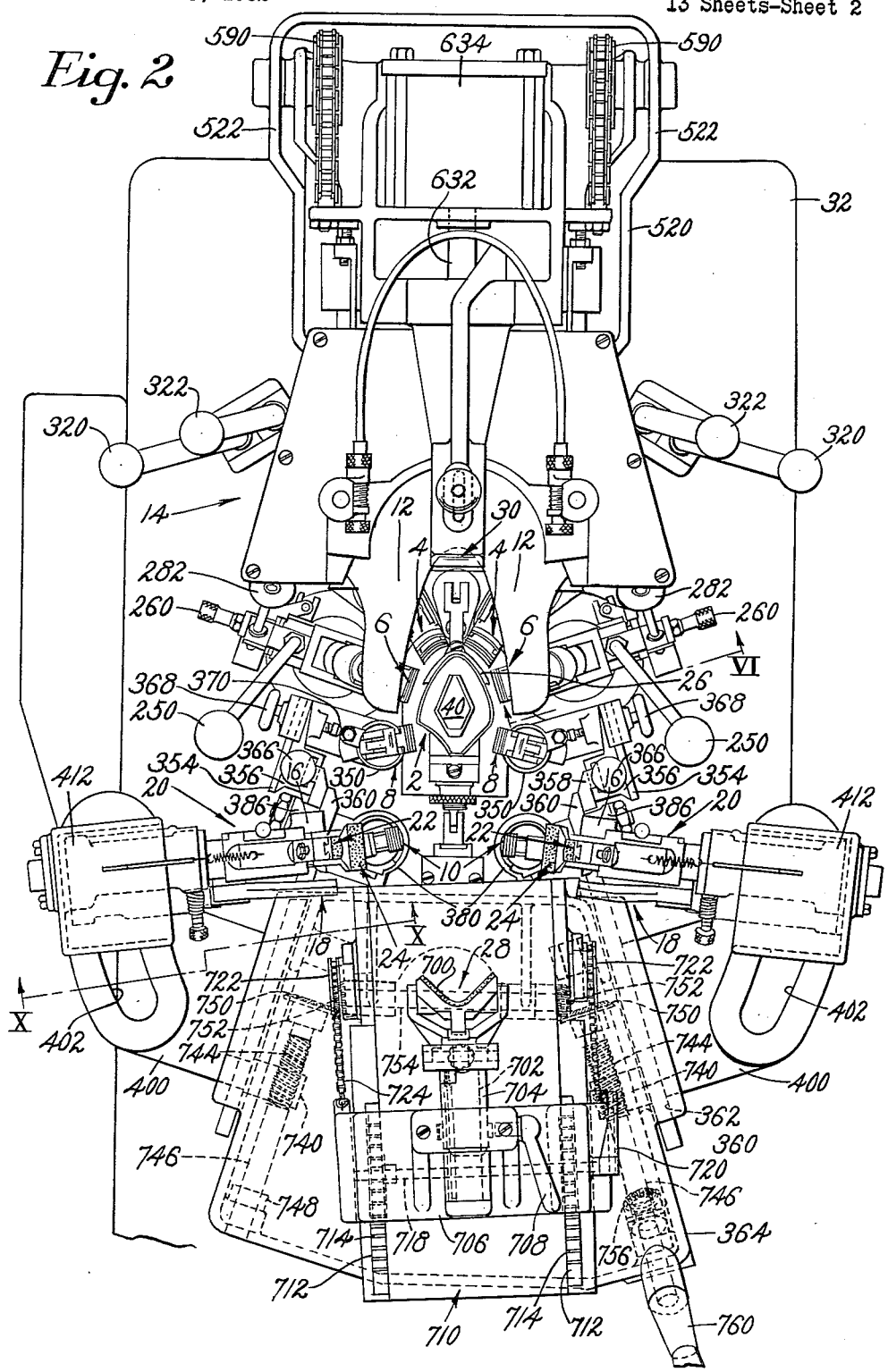
FIG. 2 is a plan view of the machine as seen in the direction of the arrow II in FIG. 1.

The illustrative machine is a shoe upper conforming machine suitable for use in performing a combined pulling over and lasting operation on the toe, forepart and joint regions of a shoe (i.e. including regions where the shoe bottom curves heightwise from the generally flat portion of the forepart into the shank portion). For supporting the forepart of a last having an insole positioned against the bottom thereof and an upper mounted thereon the illustrative machine has supporting means 2 (FIG. 2). For exerting a tensioning action on the upper the illustrative machine is provided with a plurality of forepart grippers 4, 6 and 8 and a pair of joint grippers 10, the grippers being disposed around the shoe-supporting means in the manner shown in FIG. 2. The upper is tensioned as a result of relative movement, heightwise of the last, taking place between the grippers and the shoe-supporting means.

Figure 1:
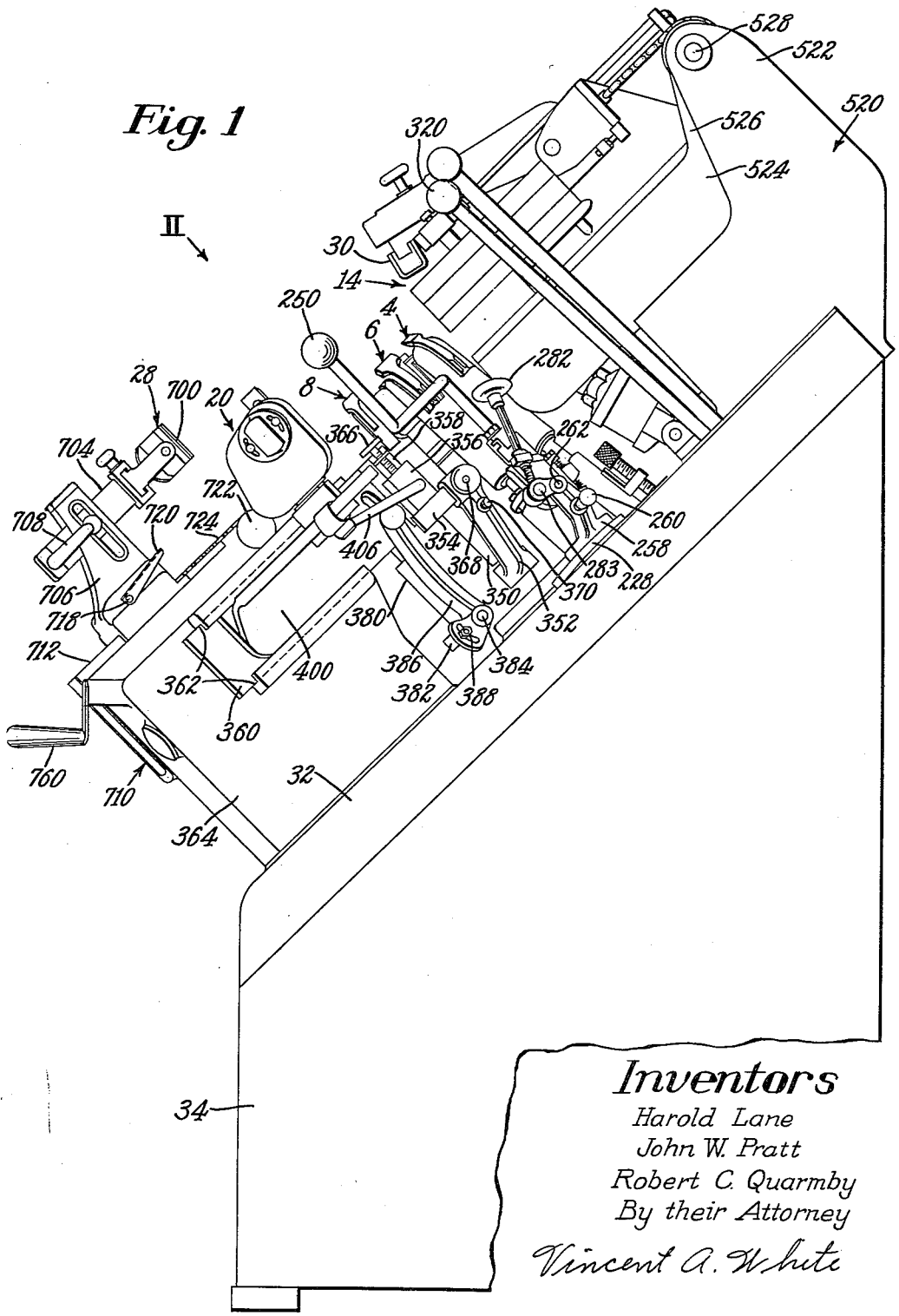
FIG. 1 is a right side elevation of a machine embodying the present invention.

For wiping marginal portions of the upper at the toe and forepart inwardly across the edge of the insole the illustrative machine is provided with a pair of toe-embracing wipers 12 mounted in a wiper box 14. For wiping marginal portions of the upper inwardly of the edge of the insole in the joint region the illustrative machine is provided with a pair of joint wipers 16 and 18 (FIGS. 10–12) on each side of the machine, the joint wipers being mounted as hereinafter described on a pair of side clamping units 20. The side clamping units are each provided with a pair of side clamps 22 and 24 for engaging the upper in the joint region just prior to the release of the upper by the joint grippers, so as to maintain tension in these portions of the upper as the joint wipers take over control of the upper from the joint grippers. For supporting the last with the shoe upper thereon against the heelward thrust of the toe-embracing wipers as they wipe the upper inwardly, the illustrative machine is provided with a heel support 28. The machine is also provided with a toe pad 30 which is arranged to engage the upper with a relatively light pressure before the toe-embracing wipers perform their inwiping operation and then to press more firmly on the upper to assist the wipers in bedding the upper firmly down to the insole. The shoe-supporting, pulling over and lasting instrumentalities above referred to are mounted on an inclined plate 32 supported on a base portion 34 (FIG. 1) of the machine frame which houses fluid-pressure-operated means for actuating various operating mechanisms of the machine.

The shoe-supporting means 2 (see particularly FIGS. 3–5) comprises an inner forepart-supporting plate 40 (see also FIG. 2) and an outer insole-supporting member 42 which is provided with an upstanding rim 44 shaped to support marginal portions of the forepart of the insole. The inner supporting plate 40 is pivotally mounted on a pin 46 carried by the upper end of a post 48. The post 48 is received within an upper sleeve-like portion 50 of a piston rod 52 which is secured at its lower end to a piston 54 slidable in a cylinder 56. The cylinder is secured to the underside of a plate 87 secured to the plate 32 and having a tubular casing 88 in which the piston rod slides. The lower end of the post 48 is provided with an inclined face 58 (FIG. 3) which is seated upon a wedge member 60. The post 48 is restrained against rotation with respect to the sleeve-like portion 50 by a pin 62 in the post riding in open ended slots 64 in the portion 50. The wedge member 60 may be adjusted to raise or lower the post by rotation of a nut 66 which is threaded on a stem 68 extending from the wedge member. The nut 66 has a flange 70 which engages in a notch 72 formed in a bracket 74 secured to the piston rod 52 and provided with a bore through which the stem of the wedge member extends.

Slidably mounted on the sleeve-like portion 50 of the piston rod adjacent its upper end is a sleeve 76 having a lug extending therefrom. Rotation of the sleeve 76 relatively to the piston rod is prevented by a key 79 secured to the sleeve and engaging a keyway in the portion 50 of the piston rod. The lug 78 is provided with a pin 80 on which is pivotally mounted a hollow block 82. This block surrounds the upper portions of the post 48 and the sleeve 76 and carries the outer insole-supporting member 42. Extending through the lug 78 is a stop screw 84 mounting a spring-pressed poppet 85 which is engageable with an abutment 86 secured to the block 82 to limit its pivotal movement in a clockwise direction as seen in FIG. 5. Upward movement of the piston rod 52 relatively to the casing 88 is limited by engagement of a set screw 90 with a face 92 on the bracket 74. A compression spring 94 in the cylinder 56 urges the piston and piston rod 52 down relatively to the casing 88 to an extent limited by engagement of the lower end of the piston rod 52 with a lower end cap 57 of the cylinder 56. A pair of tension springs 102 extending between pins 103 in the hollow block 82 and anchorages provided on the casing 88 urge the block 82 clockwise, as seen in FIG. 5, about the pivot pin 80 to a limit determined by engagement of the abutment 86 with the poppet in the stop screw 84. The springs 102 also urge the block 82 and the sleeve 76 on which it is mounted down to a limit determined by engagement of a stop screw 96 (FIG. 4) which is threaded through a lug 98 extending from the sleeve 76 with an abutment 100 provided on a lug extending laterally from the casing 88.

Figure 3:
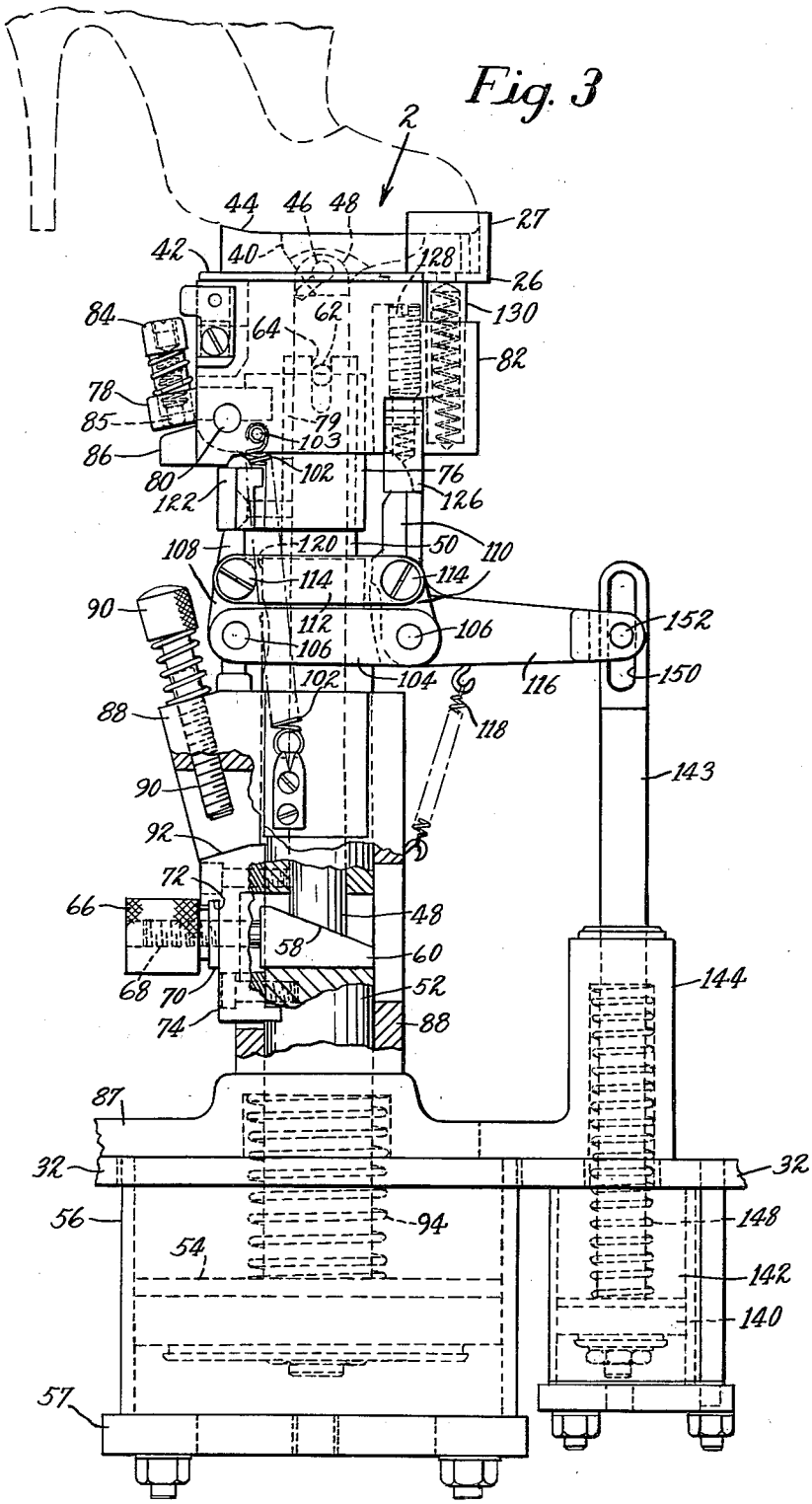
FIG. 3 is a right side elevation of shoe supporting means (shown with the axis thereof tilted through some 45° clockwise from its actual position) with which the illustrative machine is provided.

The piston rod 52 is provided with two pairs of lugs 104, each pair pivotally mounting by pins 106 a front pawl 108 and a rear pawl 110. The pawls are connected for swinging movement together about the pins 106 by means of a link 112 pivotally connected to the pawls by pivot screws 114. The rear pawl 110 has an arm 116 connected to a tension spring 118 which urges the pawls clockwise (as seen in FIG. 3) to a limit determined by engagement of the front pawl 108 with a stop face 120 on the piston rod. In this position the pawl 108 is located beneath a hardened plate 122 secured to the sleeve 76 and the pawl 110 lies beneath a block 126 adjustable heightwise in the block 82 by means of a set screw 128. Prior to the commencement of a cycle of operations of the machine, the piston 54 is held in a lowered position in the cylinder 56 by the spring 94; and as seen in FIG. 5, the inner forepart-supporting plate 40 will then occupy a lowered position with respect to the upper surface of the rim 44 of the outer insole-supporting member 42 to an extent determined by the setting of the stop screw 96. Depending upon the setting of the stop screw 84 the hollow block 82 carrying the outer insole-supporting member 42 may occupy, under the influence of the springs 102, a rearwardly canted position as shown in FIG. 5. At this stage there is a gap between the pawl 108 and the associated hardened plate 122 and between the pawl 110 and the block 126.

The retarder 26 comprises a plate having an upstanding rim 27 which, as seen in FIG. 2, is shaped in outline to engage around the toe end portion of the particular last being used. The retarder has a downwardly extending hollow stem 130 which is slidable, heightwise of the last, in a bore in the block 82. A spring received within the bore and the hollow stem 130 urges the retarder upwardly with respect to the block 82. When work is presented to the machine (it being assumed that appropriate members 40, 44 and 26 have been fitted to the shoe-supporting means) the toe end of the last will be positioned within the rim 27 of the retarder with marginal portions of the insole supported upon the rim 44 of the outer insole-supporting member 42 as indicated in FIG. 5. Assuming that the stop screw 84 has been so set that the block 82 and the member 42 supported thereon occupies a canted position as shown in FIG. 5, when the grippers have gripped marginal portions of the upper and air is admitted to the lower portion of the cylinder 56, the piston 54 will be raised to raise the inner forepart-supporting plate 40 and, through engagement of the pawl 110 with the block 126, to tilt the block 82 about the pivot pin 80 until the pawl 108 is brought into engagement with the hardened plate 122. The shoe, which at this stage will be held in place by the operator, will thus be rocked in an anticlockwise direction from the position shown in FIG. 5 to the position shown in FIG. 3 to provide an initial forward draft to the upper. The set screw 128 will have been so adjusted that when the pawls 108 and 110 engage the hardened plate 122 and block 126 respectively, the parts 40 and 42 will occupy positions as shown in FIG. 3 to provide firm support of the insole. Further upward movement of the piston 54 will raise the whole of the insole-supporting device to cause the upper to be tensioned against the action of the grippers as will be hereinafter described.

When the toe-embracing wipers 12 commence their inward wiping movement, the outer insole-supporting member 42 is allowed to retract out of the way of the advancing wipers while leaving the inner supporting plate 40 in engagement with the insole. This is achieved by the pawls 108 and 110 being rocked (anticlockwise as seen in FIG. 3) about their pivots 106 to carry them away from beneath the hardened plate 122 and block 126 respectively. The springs 102 thereupon move the block 82 and sleeve 76 down with respect to the piston rod 52 which supports the inner supporting plate 40. For so rocking the pawls there is provided a piston 140 slidably mounted within a cylinder 142 secured to the underside of the intermediate casting 32, the piston 140 being normally urged down by means of a spring 148 in the cylinder. A piston rod 143 extends upwardly from the piston and is provided at its upper end with a slot 150 through which extends a pin 152 carried between bifurcated rear portions of the arm 116. It will be understood that upward movement of the piston 140 and rod 143 acts to swing the arm 116 and the pawls 108, 110 anticlockwise as above referred to. The slot 150 permits relative heightwise movement to take place between the arm 116 and the piston rod 143 during heightwise movements of the shoe-supporting means. When the wipers have completed their inwiping operation the piston 54 is retracted to lower the inner supporting plate 40 so that, when the toe pad 30 applies heavy pressure to the shoe, the thrust is taken solely by the wipers to provide for firm bedding of the marginal portions of the upper against the insole. Retraction of the piston 54 also lowers the pawls 108 and 110, with retraction of the piston 140 allowing these to assume their initial positions as shown in FIG. 5.

Figure 6:
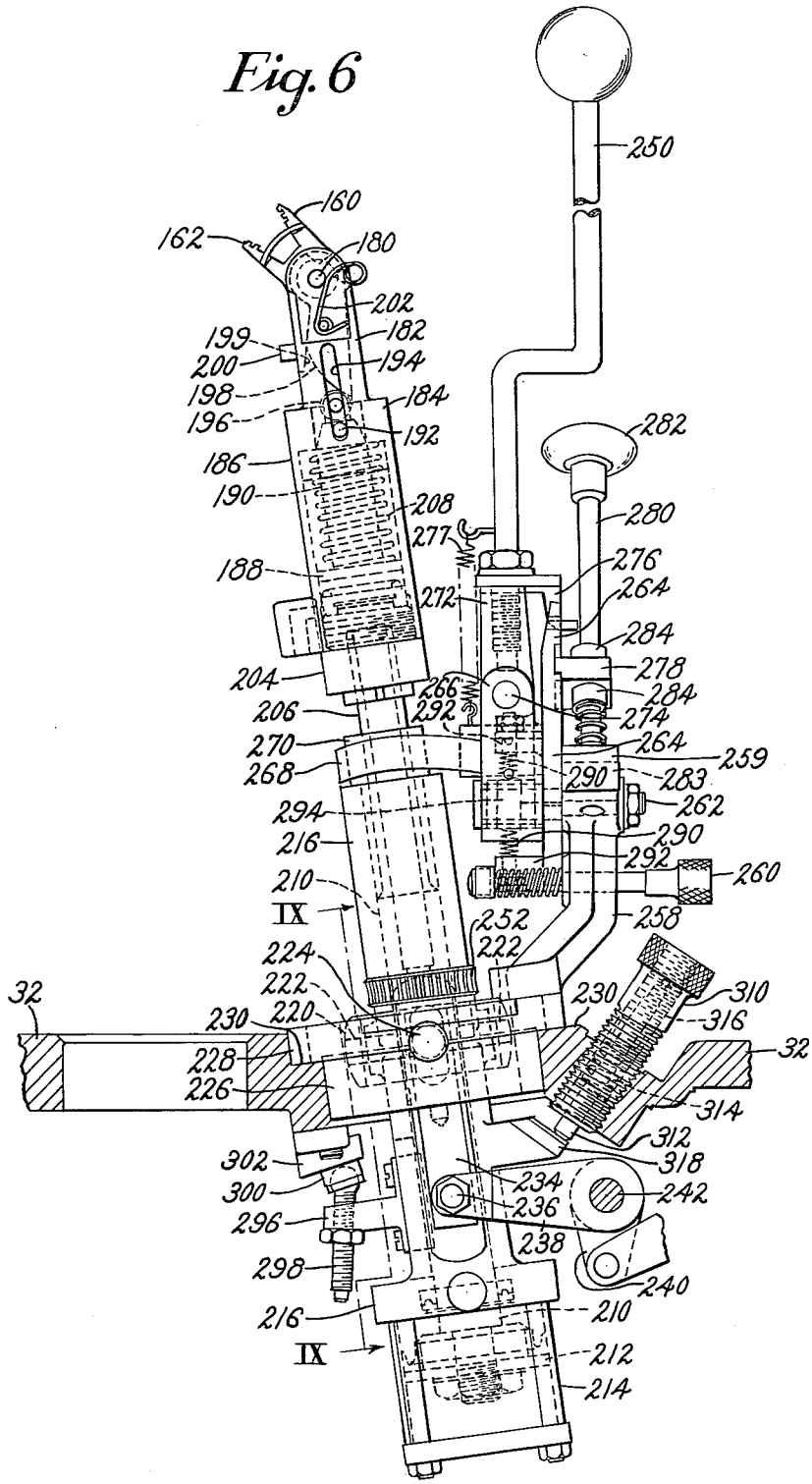
FIG. 6 is a view, looking in the direction of the arrow VI in FIG. 2, of one of the gripper arrangements of the illustrative machine.
Figure 8:
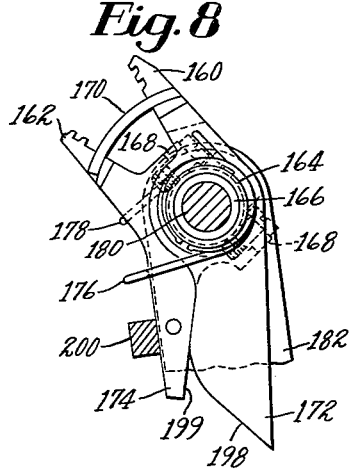
FIG. 8 is a side elevation of the gripper jaw assembly seen in FIG. 7.
Figure 7:
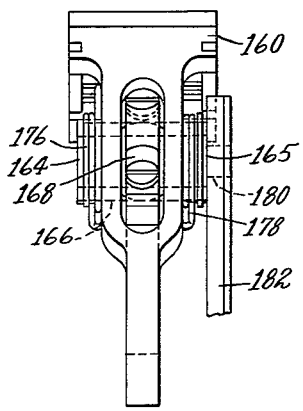
FIG. 7 is a side elevation of a gripper jaw assembly seen in FIG. 6.

The gripper arrangement will now be described with particular reference to FIG. 2 and FIGS. 6–9. The two grippers 4 at the toe end will be referred to as the toe grippers, the pair of grippers 6 lying at opposite sides of the machine adjacent the toe grippers will be referred to as the No. 1 forepart grippers, and the remaining pair 8 of forepart grippers will be referred to as the No. 2 forepart grippers. The toe grippers 4 and the No. 1 forepart grippers 6 are provided with removable jaw units so that the machine may readily be provided with jaw units having properly shaped jaws to follow closely the outline of the toe portion of the particular shoes to be operated upon. One of these jaw units is shown in FIGS. 7 and 8 and comprises an outer jaw 160 and an inner jaw 162. Extending from opposite sides of the outer jaw 160 are sleeve-like hub portions 164, 165. Received within the hub portions is a tubular bearing member 166 upon a central, part-spherical portion on which is pivotally mounted the inner jaw 162, the jaw being retained on the bearing member by means of a cap 168 secured to the inner jaw. The construction is such that, when the jaws close, limited rocking movement may take place between the jaws to allow them firmly to seat upon the material. The outer jaws 160 are provided with curved stop members 170 which bridge between the open jaws and provide guards for preventing an operator from introducing too much material between the jaws. The outer and inner jaws 160, 162 are provided with depending tail portions 172, 174 respectively with torsion springs 176, 178 being provided for urging the jaws towards their open position. The jaws are pivotally mounted upon a pin 180 which is received within the bearing member 166 and extends between bifurcated upper end portions 182 of a housing 184 (FIG. 6) providing a cylinder 186 in which is slidable a jaw-closing piston 188. The piston 188 has a piston rod 190 upstanding therefrom, an upper end portion of the piston rod being slidably mounted in a bearing in the housing 184. A pin 192 extends transversely from the piston rod 190 into slots 194 in the housing 184 to restrain the piston rod against rotation. The upper end of the piston rod carries a roll 196 adapted to engage an inclined face 198 (FIG. 8) on the gripper tail portion 172. The tail portion 174 of the inner jaw 162 is engageable with an abutment 200 bridging the bifurcated end portions 182 of the housing 184. The pin 180 carrying the gripper jaws is normally retained against displacement with respect to the bifurcated portions 182 by means of a spring wire member 202 which is carried by one of the bifurcated portions 182 and engages a groove in the pin. Should an operator wish to change the jaws of the toe and No. 1 forepart grippers in the machine he may displace the spring wires 202 and remove the pins 180 whereupon the jaw assemblies may be withdrawn from the bifurcated portions 182 of the housings 184.

The lower ends of the cylinders 186 are closed by end caps 204 which have depending therefrom hollow stems 206. Springs 208 housed within the cylinders normally urge the pistons 188 down permitting the springs 176, 178 to open the gripper jaws. It is desirable that the jaws are caused to release their grip on the upper when the wipers have performed their downwiping operation on the upper and are about to commence their inwiping movements. At this state of the cycle of operations, the wiper plates may lie so closely adjacent the upper jaws of the grippers (particularly when the machine is operating upon shoes having scantily cut uppers) that the upper jaws cannot pivot to any extent away from the lower jaws. In this case, when the pistons 188 retract the rolls 196, the jaws 162 may swing about their pivotal connections, to a limited extent, away from the upper jaws 160, thus allowing the jaws to open sufficiently for the wipers to be able to drag upper material from between the jaws without undue restriction. Each stem 206 is formed integrally with a piston rod 210 which at its lower end is connected to a piston 212. The piston 212 is slidable within a cylinder 214 secured to the lower end portion of a tubular casting 216 within which the piston rod 210 slides, and by which the gripper as a unit is mounted on the machine.

Figure 9:
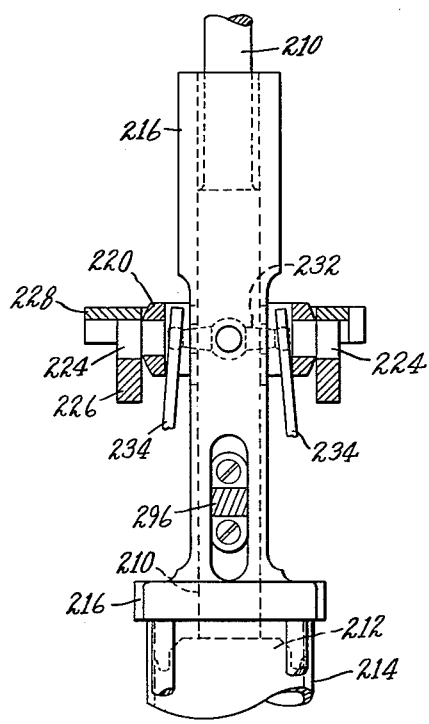
FIG. 9 is a section substantially on line IX—IX of FIG. 6.

The toe grippers and the No. 1 forepart grippers are, as thus far described, generally similar, but the manner of mounting them in the machine is somewhat different. The manner in which a No. 1 forepart gripper is mounted in the machine is shown in FIGS. 6 and 9. A gimbal ring bearing 220 carries oppositely disposed pins 222 which extend within oppositely disposed bores in the tubular casting 216. The gimbal ring bearing 220 also carries a pair of axially alined pins 224 disposed at right angles to the pins 222. The pins 224 are received within bores provided in a sleeve 226 having a flange 228 secured thereto which seats upon a face 230 formed, at an angle appropriate to support the particular gripper, upon the plate 32. Pivotally connected to the piston rod 210 is a dumb-bell lever 232 (FIG. 9) which at opposite ends is connected by ball and socket joints to upper end portions of a pair of links 234. Lower end portions of the links are connected, by ball and socket joints 236 (FIG. 6), to arms 238 of a lever also having a depending arm 240. The lever 238, 240 is pivotally mounted on a pin 242 carried by a bracket (not shown) secured to the underside of the intermediate casting 32. The gripper may therefore be swung about the axis of the pins 224 to carry the jaws of the gripper towards or away from the edge of a last supported on the shoe-supporting means. Movement of the gripper about the axis of the pins 222 will move the jaws substantially parallel with the edge of the adjacent portion of the last. Such movement may be employed to correct, to some extent, the position of an upper on the last when the gripper is gripping the upper, and is brought about by manipulation of a handle 250 as will be shortly described. The No. 1 forepart gripper at each side of the shoe may be rotated about the axis of the piston rod 210 to a limited extent to provide an adjustment to bring the edges of the gripper jaws into optimum relation with the edge of the last in the vicinity of the gripper. Rotation of the No. 1 forepart grippers is brought about by rotation of knurled knobs (not shown) connected with worms (not shown) which engage worm wheels 252 (FIG. 6) secured to the tubular casting 216. The worms are mounted on brackets (not shown) secured to the upper face of the plate 32.

Secured to each plate 228 which supports the associated No. 1 forepart gripper on the intermediate casting 32 is a bracket 258 (FIGS. 1 and 6) through which is threaded a stop screw 260 for limiting outward (i.e. away from the last) swinging movement of the gripper. A pivot stud 262 (FIG. 6) is secured to an upper end portion of each bracket 258 and has pivotally mounted on it a locating plate 264 and a bracket 266. The bracket 266 carries a forked member 268 having a pair of arms extending into guideways formed in a portion 270 of the casting 216, the guideways and the arms being as curved as to permit swinging movement of the gripper about the axis of the pins 224 (see FIG. 6). The forked member 268 has a stem which is received in a bore in the bracket 266, so that the forked member 268 is free to pivot in its bore in the bracket 266 as the latter is swung about the pivot stud 262. Pivotal movement of the bracket on the stud 262 will swing the gripper about the axis of the pins 222 to move the gripper jaws substantially parallel to the edge of the adjacent portion of the last. The handle 250 above referred to is mounted in a block 272 which is pivoted on a pin 274 extending through upstanding lugs on the bracket 266. Secured to the block 272 is a detent 276 which is arranged normally to engage in a notch in the locating plate 264, as urged by a tension spring 277. The locating plate 264 has secured to it a block 278 through which extends a spindle 280 having a hand wheel 282. The lower end of the spindle 280 is threaded into a pin 283 (see also FIG. 1) mounted in a lug 259 on the bracket 258. The spindle 280 is held against axial movement relative to the plate 264 by collars 284 at opposite sides of the lug 278. Rotation of the hand wheel 282 thus is effective to swing the locating plate 264 to a limited extent about the axis of the pivot stud 262 and thus to position the gripper initially in a direction extending parallel to the adjacent edge of the last. If the handle 250 is swung to the right as seen in FIG. 6 about the axis of the pin 274 the detent 276 will be removed from the notch in the locating plate 264 and the bracket 266 and forked member 268 carried thereby may be swung about the axis of the pivot stud 262 to swing the gripper to a limited extent along the edge of the last for connecting the position of the upper if necessary while the gripper is gripping the upper. For controlling the gripper again when it releases the upper there is provided a pair of compression springs 290 received between lugs of a bracket 292 secured to the locating plate 264 and an arm 294 extending laterally from the bracket 266.

For limiting upward movement of the piston rod 210 and thereby determining the initial heightwise position of the gripper with respect to the shoe there is secured to a lower portion of the piston rod a bracket 296 through which is threaded a stop screw 298. The stop screw supports, by a ball and socket connection, a small block 300 which is arranged to engage a block 302 secured to the underside of the intermediate casting 32. Adjustment of the stop screw 298 will set initially the heightwise position of the gripper. A hollow adjusting screw 310 is threaded through the intermediate casting 32 and has extending through its lower end a poppet 312 which is backed by a spring 314 in screw 310. The lower end of the poppet 312 is arranged to engage an inclined face of a lug 318 formed on the tubular casting 216. A torsion spring not shown normally holds the gripper in a position in which the tubular casting 216 engages the stop screw 260 thus positioning the jaws of the gripper at the desired distance from the edge of the last. When air is admitted above the piston 212 in the cylinder 214 and relative heightwise movement is caused to take place between the shoe-supporting means and the gripper to tension the upper, inward swinging movement of the gripper is resisted by the spring-pressed poppet 312 engaging the lug 318. Thus, when the wipers perform their downwiping operation on the upper, the upper is held by the grippers in an outspread condition; but as the wipers descend, the upper may be drawn inwardly as the grippers are swung against the action of the springs 314 behind the poppets 312. When tension is applied to the upper the pull exerted on the upper may be increased or decreased manually by the operator by manipulation of handles 320 (FIGS. 1 and 2) which are pivotally mounted on brackets carried by the intermediate casting 32 and are connected, via appropriate linkages (not shown) with the arms 240 (FIG. 6).

The jaw-closing and gripper-pulling arrangements of the toe grippers 4 are generally similar to those above described with reference to the No. 1 forepart grippers 6 but the tubular castings (corresponding to the castings 216 above referred to) are secured directly to gimbal ring bearings (i.e. there are no pins corresponding to the pins 222). The toe grippers may thus pivot only about pins corresponding to the pins 224 to allow the jaws to move towards and away from the edge of the last. Handles 322 similar to the handles 320 are provided for adjusting manually the tension applied to the upper by the toe grippers.

The jaws of the No. 2 for part grippers 8 are not readily detachable as assemblies from the grippers as are those of the toe grippers 9 and the No. 1 forepart grippers 6 as it is unnecessary for the operator to change these jaws. The jaw-closing arrangement is, however, generally similar to that of the toe grippers. The gripper-pulling pistons are, however, housed in cylinders 350 (FIGURES 1 and 2) which are pivotally mounted (for swinging movements towards and away from the edge of the last) on pivot pins (not shown) carried by lower end portions of brackets 352. The brackets 352 are adjustably mounted, for movements lengthwise of the shoe, on guide members 354 formed on slides 356. The slides 356 are slidable heightwise on guideways formed on brackets 358 secured to main slide members 360. The slide members 360 are received for movement lengthwise of the shoe in guideways 362 formed in a casting 364 secured to the upper face of the intermediate casting 32. Heightwise adjustment of the slides 356 (and hence of the No. 2 forepart grippers) is effected by means of adjusting screws 366 which are threaded into the slides 356 and have flanges engaging recesses in the brackets 358. Clamping screws 368 are provided for retaining the No. 2 forepart grippers in adjusted position, lengthwise of the shoe, with respect to the guide members 354. Stop screws 370 adjust the initial positions of the No. 2 forepart grippers inwardly and outwardly with respect to the edge of the last, the cylinders 350 being urged outwardly by springs (not shown) until they engage the stop screws.

The joint grippers 10 have jaw-closing and upper-pulling piston and cylinder arrangements similar to those of the No. 2 forepart grippers but lower end portions of cylinders 380 in which their upper-pulling pistons are housed are carried by brackets 382 which are mounted on pivot pins 384 carried at lower end portions of arms 386. A clamping nut and screw arrangement 388 are provided to clamp the bracket in position about the pin 384, the screw extending through an arcuate slot in the arms 386. Upper end portions of the arms 386 are secured to the main slide members 360 by screw and slot connections to provide heightwise adjustment of the joint grippers relatively to the slide members and hence to a last supported in the machine. The arms 386 may be swung, when the screws of the screw and slot connections 388 are loosened, to adjust the position of the joint grippers lengthwise of the last.

Each of the side clamping units 20 (FIGS. 10–12), which also carry the joint wipers 16, 18 and their associated mechanism, is adjustably secured to a bracket 400 carried by a casting 364 mounted on the plate 32. To provide for adjustment of the position of the unit relative to the ball region of a shoe and with respect to the main slide member on which it is mounted, arcuate slots 402 are formed in the brackets 400. A clamping bolt 404 (FIG. 10) having a handle 406 by which it may be tightened extends through a clamping plate 408, then through the slot 402 and is threaded into a base plate 410 of the appropriate side clamping unit 20. A main casting 412 of the unit is provided with arcuate guides 414 slidable in the base plate 410 by which the unit is secured to the bracket 400. The guides 414 are provided with teeth 416 which engage corresponding teeth on a rack 418 adjustable in the base plate 410 by rotation of a knurled nut 422 on a threaded stem portion of the rack. Rotation of the nut 422 will therefore move the rack endwise and thereby tilt the casting 412 with respect to the base plate and this, as will be apparent from FIG. 10, will raise or lower the side clamps 22, 24 and the ball wipers 16, 18 relatively to the last.

Figure 10:
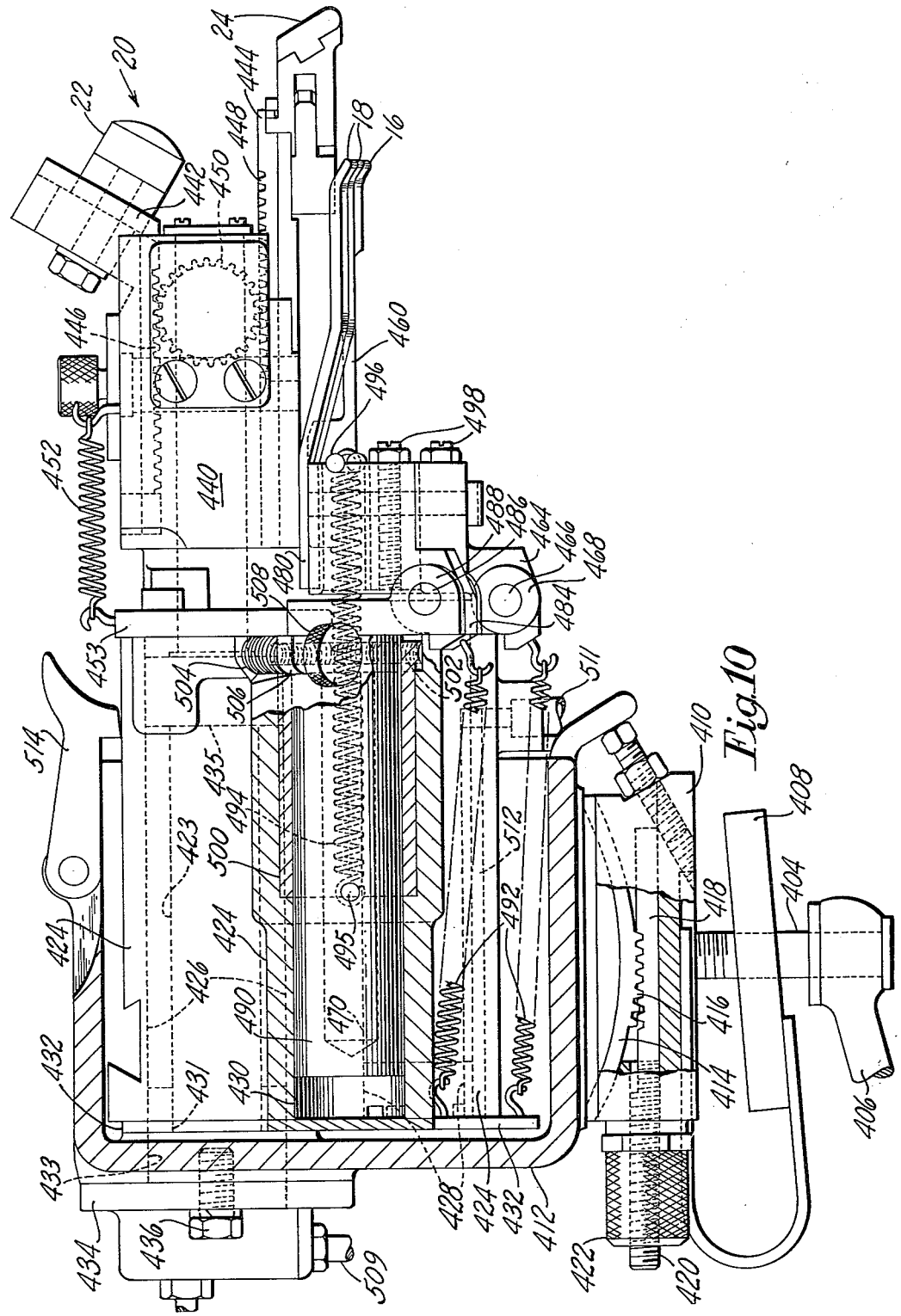
FIG. 10 is a section substantially on line X—X of FIG. 2 with parts broken away.
Figure 11:
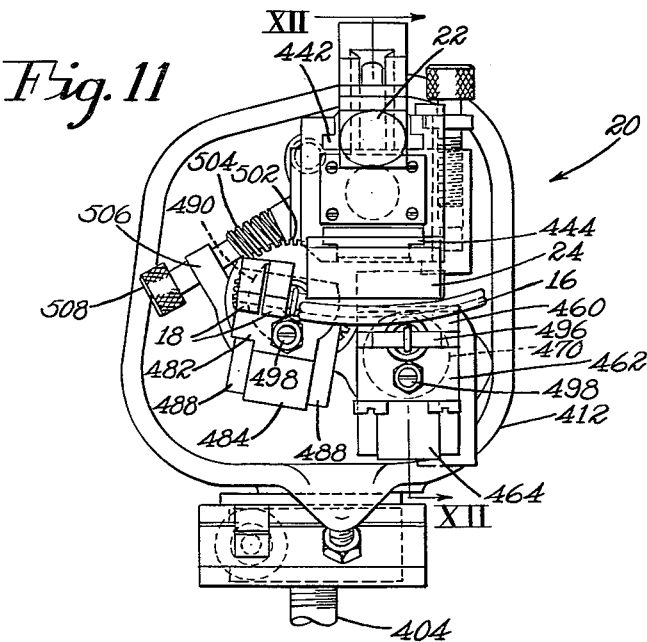
FIG. 11 is an end view of the mechanism shown in FIG. 10.
Figure 13:
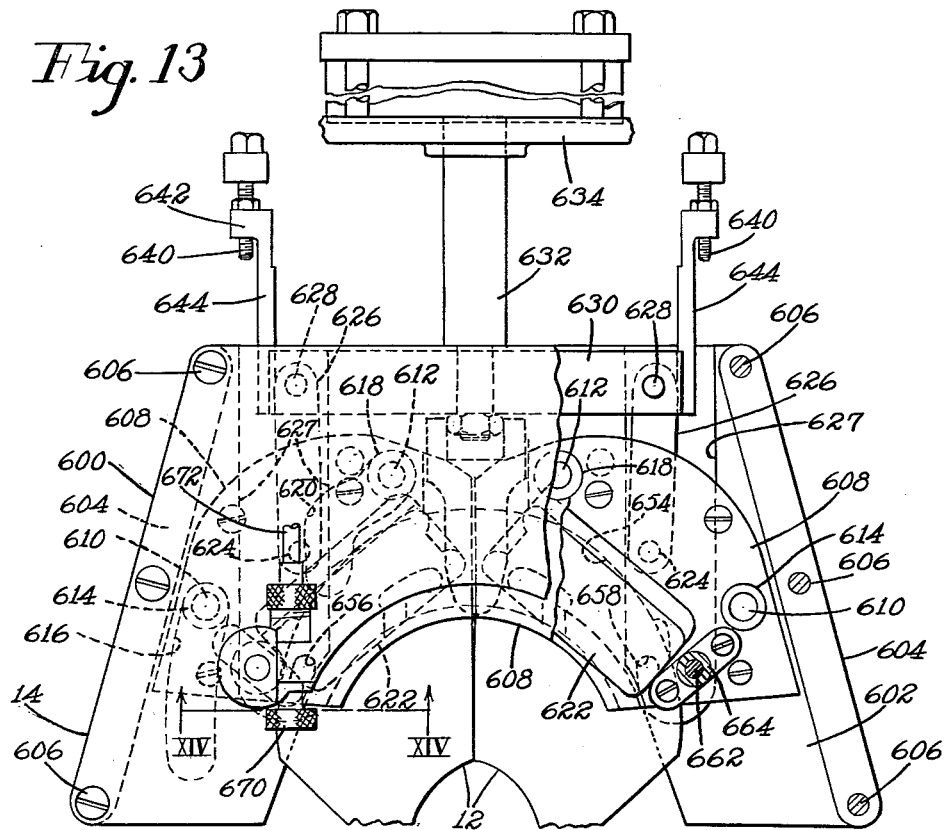
FIG. 13 is a plan view of the main wiper assembly of the illustrative machine, with parts broken away.

The main casting 412 provides a hollow housing having adjustably secured to it a piston rod 423 on which is slidably mounted a cylinder block 424 provided with three bores providing cylinders 426, 428 and 430. The piston rod 423 extends through a bore 431 in an end cap 432, secured to the block 424, and through a bore 433 in the main casting 412. Outside the casting 412 the piston rod has formed thereon a flange portion 434 by which it is secured to the casting 412 by bolts 436 extending through arcuate slots in the flange. The piston rod has secured thereto a piston 435 on which the cylinder bore 426 is arranged to slide. The inner end of the cylinder block 424 has secured to it a block 440 which slides on a reduced end portion of the piston rod 423. A key (not shown) in the rod extending into a keyway in the block 440 prevents rotation of the cylinder block 424 on the rod. Slidably mounted in guideways provided in the block 440 are two slides 442 and 444 carrying the clamps 22, 24 respectively. The slides are provided with rack teeth 446, 448 which engage a pinion 450 in the block so that the slides 442 and 444 and their respective clamps are constrained to move equally but in opposite directions relatively to the block 440. A spring 452 anchored to the slide 442 and to a flange 453 of the block 440 normally urges the slide 442 towards the left, as seen in FIG. 10, so that the lower slide 444 and its clamp 24 are projected toward the show with respect to the upper side clamp 22. When air is admitted from a pipe 509 through a passage 510 in the piston rod 423, the block 440 is moved in a direction to carry the side clamps towards the shoe. During such movement the lower side clamp 24 will engage the side of the shoe in the ball region at a locality near the bottom of the last and its movement will thereby be arrested. Further movement of the block 440 towards the shoe rotates the pinion 450 to engage the upper side clamp with the shoe at a level above the clamp 24.

Each one of the ball wipers 16 is formed at one end of a plate-like arm 460 extending toward a shoe in the machine and under the slide 444. The arm 460 is secured to a block 462 having a depending lug 464 pivotally mounted on a pin 466 carried between ears 468 depending from a head portion of a piston rod 470 slidable in the cylinder 428. The wipers 18 at each side of the machine comprise a pair of fingers extending from a plate 480 which is secured to a block 482 provided with a downwardly extending lug 484. The lug 484 is pivotally mounted on a pin 486 carried between ears 488 depending from a head portion of a piston rod 490 slidable within the cylinder 430. The piston rods 470 and 490 are normally held retracted within their cylinders by means of tension springs 492 connected between the end cap 432 and hooks secured to the lugs 464 and 484. The piston rods 470 and 490 and their associated blocks 462 and 482 are provided with bores which accommodate springs 494 extending between pins 495 in the piston rods and pins 496 retained in grooves in end faces of the blocks to urge the blocks anticlockwise about the pins 466 and 486 respectively to urge the wipers 16 and 18 upwardly toward the shoe bottom. The upward movement of the wipers is limited by engagement of stop screws 498 extending through the blocks 462 and 482 with head portions of the corresponding piston rods. When the wipers 16, 18 are moved inwardly to wipe upper material beneath the insole, the wipers may yield heightwise against the action of the springs 494.

The piston rod 470 is restrained against rotation within the cylinder by means of a screw (not shown) threaded radially into the piston riding in a slot extending lengthwise of the cylinder. Similarly the piston rod 490 is restrained against rotation relatively to a sleeve 500 which is received within an enlarged end portion of the cylinder 430. The sleeve 500 is provided with a flange 502 having teeth which are engaged by a worm 504. The worm 504 is journaled in lugs 506 formed on the cylinder block 424 and is provided with a knurled head 508. Rotation of the worm will serve to rotate the sleeve 500 and the piston rod 490 relatively to the cylinder block 424 to adjust the angular relationship between the wipers 18 and the associated wiper 16 to accommodate the ball wipers to the heightwise curvature of the shoe bottom in the region to be operated upon by the wipers. To move the wipers 16, 18 inwardly toward the shoe to wipe the upper over the insole at the ball regions air is admitted to the cylinders 428 and 430 (between which there is a communicating passage at the left hand end of the cylinders, as viewed in FIG. 10) from a pipe 511 communicating with a bore 512 extending through the cylinder block into the cylinder 428. The ball wipers 16 extend toewardly beyond the clamps 22, 24 and outwardly from the shoe, as best seen in FIG. 2, forming a pad which will be engaged by the most heelward end of the associated forepart wiper 12 during its downwiping movement as will presently appear.

The machine is provided with means for adjusting the main slide members 360 (FIGS. 1 and 2) carrying the side clamping units, the ball wipers and ball grippers, and the No. 2 forepart grippers generally lengthwise of a shoe supported in the machine, i.e. towards and away from the toe end of the shoe. Each of the slide members 360 has a lug 740 extending inwardly through a slot in the casting 364. The lugs 740 have threaded bores receiving threaded portions 744 of shafts 746 journalled in the casting 364 (FIG. 2). The shafts 746 are held against endwise movement and are provided with bevel gears 750 which engage bevel gears 752 secured to opposite ends of a cross shaft 754. The shaft 746 at the right hand side of the machine as seen in FIGURE 2 is connected by bevel gears 756 to an inclined shaft having a handle 760 by which the shafts 746 may be rotated. It will be appreciated that rotation of the handle 760 therefore brings about movements of the slide members 360 lengthwise of their guideways in the casting 364 to adjust the positions of the parts supported thereby towards or away from the toe end of the shoe.

The wiper box 14 carrying the forepart wipers 12, together with their operating mechanisms, are supported by a top casting 520 (FIGS. 1 and 2) which is secured to the plate 32. A pair of arms 522 upstanding from the casting 520 carry pins 528 on which are pivotally suspended a pair of arms 526 upstanding from one end of a cradle 524. The other end of the cradle is supported on a pin 531 in the upper end of a rod 529 (FIGS. 16 and 17) projecting from a piston in a cylinder 530 connected to the casting 520 by a pin 532. The wiper box 14 is secured to a carrier 534 mounted for sliding movements lengthwise of a shoe in guideways 533 in the cradle 524. It should be apparent that admission to and exhaustion of fluid from the cylinder 530 will act to raise and lower the wipers 12.

For advancing and retracting the wiper box and wipers lengthwise to and from their downwiping position with respect to the shoe the following mechanism is provided. A piston in a cylinder 540 (FIG. 16), mounted on the plate 32 by a pin 542, is connected by a rod 544 to a pin 548 in an arm 550 secured to a shaft 552 journaled in a lug 554 depending from the cradle 524. An arm 556, also secured to the shaft 552, is connected by a pin 558 and link 560 to an eccentric portion 562 of a pin 564 mounted in a bracket 581 depending from the carrier 534. The piston in the cylinder 540 initially lies adjacent the top end of the cylinder and when air under pressure is admitted to the upper end of the cylinder, the piston moves downwardly to swing the arms 550 and 556 anticlockwise, as seen in FIG. 16, until the toggle formed by the arm 556 and link 560 is in a straightened condition. A device 566, extending through a slot 568 in one side of the cradle 524, is provided for rotating the pin 564 to adjust the limit of forward movement of the wipers to determine their downwiping positions relative to the forepart of the shoe. In this position, the most heelward ends of the wipers overlie the exposed portions of the ball wipers 16 so that during their downwiping movement caused by operation of the cylinder 530 the wipers 12 depress the ball wipers 16 before wiping inwardly over the insole.

The carrier 534 is also used to provide a support for the toe pad 30 and for this purpose is provided with a pin 570 on which a bell crank lever 572 is freely pivoted. A forwardly extending arm of the bell crank lever has adjustably secured to it the toe pad 30, the adjustment providing for positioning of the pad lengthwise of the shoe. A clamping arrangement 574 is provided for adjustably securing the toe pad in the desired position. A depending arm of the bell crank lever 572 is provided with a slot 576 receiving a pin 584 carried by a piston rod 582. The rod is secured to a piston slidably mounted in a cylinder 580 secured to the bracket 581. Rearward movement of the piston in the cylinder 580 will therefore rock the bell crank lever 572 clockwise to cause the toe pad 30 to apply pressure to the shoe.

The wiper box 14 comprises upper and lower plates 600, 602 which are spaced apart by members 604 to provide a cavity receiving carriers 608 in which the wipers 12 are detachably secured. The wiper carriers are guided in the wiper box by appropriate cam slots to impart opening and closing, and advancing and retracting movements to the wipers during their inwiping operation. The carriers 608 have depending therefrom pins 624 by which they are connected by links 626 to pins 628 in opposite ends of a crossbar 630. The bar is secured to a piston rod 632 extending from a piston (not shown) housed within a cylinder 634 secured to the carrier 534 (see also FIGS. 1 and 2). Forward movement of the piston rod upon admission of fluid to the cylinder causes the carriers 608 to swing inwardly and to advance relatively to the wiper box, causing the wipers 12 to perform their inward wiping movements to wipe the forepart of the shoe upper over the insole. During their inwiping movements the heel ends of the wipers 12 overlap that portion of the upper previously wiped by the ball wipers 16 to eliminate undesirable wrinkles which might otherwise be formed.

Figure 14:
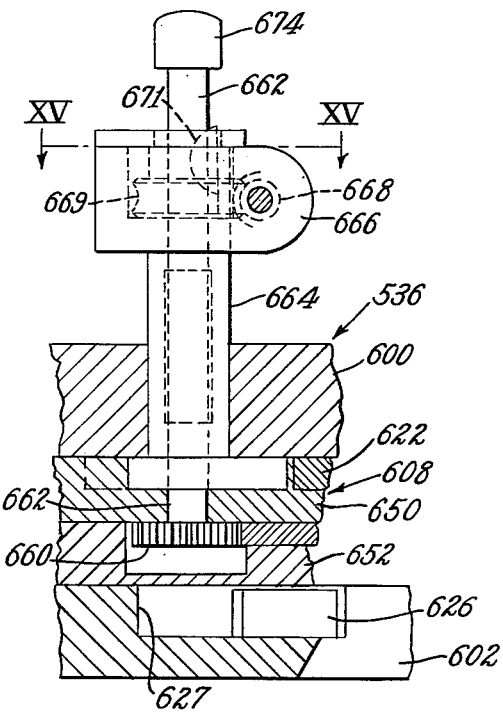
FIG. 14 is a section on the line XIV—XIV in FIG. 13.
Figure 15:
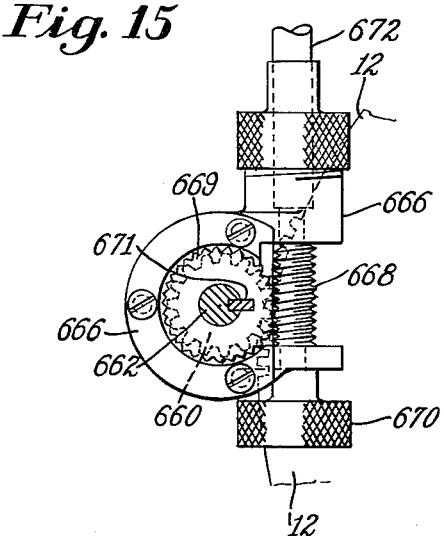
FIG. 15 is a section substantially on line XV—XV of FIG. 14.

Each of the wiper carriers 608 comprises upper and lower plates 650, 652 (FIG. 14) which are secured together and provide a recess with an arcuate wall 654 against which a corresponding wall on the wiper engages. The wall 654 is concentric with the point (at the meeting point of the upper-engaging edges of the wipers) about which the wipers swing during their opening and closing movements. Each wiper has two pins (not shown) depending therefrom and these pins are received within open-ended slots 656, 658 in the plate 652 to assist in positioning the wipers with respect to their carriers. Forward portions of the outer arcuate walls of the wipers are provided with teeth engagable with teeth of pinions 660 secured to lower end portions of spindles 662. The spindles 662 are journaled in sleeves 664 secured to, and upstanding from, the plates 650. The sleeves 664 have secured to their upper ends housings 666 for worms 668 which are rotatable by knobs 670 and engage worm wheels 669, keyed by keys 671 to the spindles 662. A flexible shaft in a housing 672 connects the worms 668 at each side of the wiper assembly so that rotation of one knob 670 rotates both spindles 662 for equal adjustment of both wipers. For removing the wipers the spindles 662 are provided with knobs 674 for depressing the spindles axially to lower the pinions 660 out of engagement with the teeth on the wipers which are then freed for removal. After the replacement of the wipers, the spindles 662 may be raised to re-engage the pinions 660 with the teeth on the wipers. Rotation of one or other of the knobs 670 will then impart a limited amount of rotation of the wipers with respect to their carriers to adjust the position of the upper-engaging edges of the wipers towards or away from each other as may be desired to suit them properly to engage the upper around the toe of the last.

The heel support 28 (FIGS. 1 and 2) comprises a V-shaped heel-end-engaging member 700 which is adjustably mounted on a piston rod 702 slidable (lengthwise of a shoe sopported on the machine) within a cylinder 704 supported, so as to be adjustable heightwise with respect to the shoe on two arms of a bracket 706, a clamping device 708 being provided for clamping the cylinder in adjusted position. The bracket 706 is mounted on the casting 364 so as to be adjustable towards and away from the heel end of a shoe supported in the machine to accommodate shoes of widely different sizes. The bracket 706 also straddles a shoe receptacle 710 which lies beneath the heel support and is adapted to catch a shoe as it is released from the machine at the end of a cycle of operations. For adjusting the heel support lengthwise the bracket 706 is guided by rails 712 formed at either side of the shoe receptacle. Ratchet teeth 714 on the rails are engageable by pawls secured to a cross shaft 718 journalled in the base of the bracket. A hand lever 720, secured to one end portion of the shaft 718, provides a ready means for the operator to release the pawls from the teeth 714 and thereby to permit adjustment of the position of the bracket 706 with respect to the rails. The weight of the heel support is at least partially balanced by spring loaded pulleys 722 connected to the bracket 607 by chains 724.

A cycle of operations of the illustrative machine will be outlined with reference particularly to FIG. 18. Air under pressure is supplied via a pressure regulating value $V_1$ and a filter F to a main supply line L. Assuming that the machine has been provided with appropriate wipers 12 and that the ball clamping and wiping units 20 have been adjusted to suit the size and style of shoe to be operated on, the operator will present a last having an insole and upper assembled thereon to the machine. The toe end of the last is positioned lengthwise and widthwise by engagement with the retarder 26 on the shoe support 2 and the marginal portions of the upper at the forepart are placed in the open jaws of the grippers 4, 6 and 8. The ball grippers at this time occupy lowered positions out of reach of the upper.

Depression of a foot treadle (not shown) causes energization of two solenoid valves S1 and S2 which admit air from line L to the gripper-closing cylinders 186 to close the grippers 4, 6 and 8 on the upper. Upon closing of the grippers, a build-up of pressure operates a pressure-sensitive switch PS1 which brings about energization of solenoid valves S3 and S4. Valve S3 thereupon supplies air beneath the piston 54 to raise the shoe-supporting means 2 and apply tension to the upper which is held by the grippers. Valve S4 admits air to cylinders 380 to cause the ball grippers to rise ready to grip the upper. As the shoe-supporting means 2 reaches the upper limit of its movement, a mircoswitch MS1 is automatically closed to energize solenoid valves S5 and S6. Valve S5 admits air under pressure above pistons 212, 214 arranged to impart additional heightwise pulling force on the forepart grippers as determined by pressure regulating valves $V_2$ and $V_3$. Valve S6 admits air to the heel support operating cylinder 704 to cause the heel support 28 firmly to engage the heel end of the shoe. Air from valve S6 also operates a pilot valve which opens a line to a cylinder 580 which applies the toe rest 30 to the shoe. However, no air at this stage is supplied to the cylinder.

Assuming that the operator is satisfied with the way in which the upper is tensioned and positioned over the last, he will depress the treadle again to energize solenoid valve S7 to cause the ball grippers to grip the upper. As pressure builds up in the line supplying the ball gripper closing cylinders 187 after the jaws of those grippers have gripped the upper, a pressure swtich PS2 operates to deenergize solenoid valve S4 to cause the ball grippers 10 to pull the upper, and to energize solenoid valve S8 to cause the side clamps 22, 24 to move into pressing engagement with the shoe, and also acts to cause air to flow via a cam operated valve C1 to the cylinder 530 which raises the wiper head 14. When pressure builds up in the side clamp operating circuit, a pressure switch PS3 operates to energize solenoid valve S9 to cause the ball wipers 16 to perform their inwiping operation, to deenergize solenoid valve S7 to cause the ball grippers to release their grip on the upper as the ball wipers move in, and to energize solenoid valve S10 to cause the wiper head 14 to advance reday for the toe-embracing wipers 12 to perform their downwiping operation on the upper. When the wiper head arrives in its forward position a cam CAM1 is operated to shift the valve C1 to reverse the supply connection to the cylinder 530 which thereupon lowers the wiper head to cause the wipers to perform their downwiping operation on the upper and to depress the ball wipers 16. Air is also supplied to the cylinder 580 to cause the toe rest 30 to engage the upper, initially under a relatively light pressure. As the wipers arrive at their wiping-in level, microswitch MS2 is closed to energize solenoid valve S11 which causes air under pressure to be supplied to the rear end of cylinder 634 to effect the wiper advancing and closing movements. As the wipers commence their inwiping movements microswitch MS3 is closed to cause solenoid valve S12 to supply air to the cylinder 142 to release the plate 42 of the shoe support which descends out of the way of the advancing wipers.

As the wipers complete their inwiping movements a microswitch MS4 is operated to deenergize solenoid valves S3 and S12 and to energize solenoid valve S13. Deenergizing valves S3 and S12 brings about the complete lowering of the shoe support, leaving the work supported only upon the wipers, while energization of valve S13 increases the pressure with which the toe rest engages the work to cause the wipers to exercise a bedding pressure on the inwardly wiped lasting margin. After an appropriate dwell period the operator will trip the machine causing the wipers, heel support, side clamps and toe rest to return to their initial positions. The machine is then ready to commence another cycle of operations.

Having thus described our invention what we claim as new and desire to secure by Letters Patent of the United States is:

1. In a machine for shaping uppers over lasts, ball wipers yieldable heightwise of the last and arranged to wipe opposite marginal portions of the upper inwardly over the last bottom at the ball line, and forepart wipers effective after the wiping action of the ball wipers to wipe the upper heightwise around the forepart of the last and thereafter inwardly over the last bottom, the heelward ends of the forepart wipers being arranged to overlie and depress the ball wipers during the heightwise and inward wiping actions of the forepart wipers.

2. In a machine for shaping uppers over lasts, a pair of wiping units adapted to operate on an upper at opposite sides of a last on the ball regions, each unit including a first wiper movable inwardly to wipe the upper over the edge of the last bottom at the ball region, and a second wiper movable inwardly to wipe the upper over the edge of the last bottom region that extends heightwise of the last from the ball region toward the heel end of the last, means for adjusting said wipers to vary the angular relation of the wiping surfaces of the first and second wipers to cause said surfaces to conform substantially to the contour of the last bottom extending over the ball region toward the heel end, and means for bodily adjusting each unit independently to vary the direction of its inward wiping movement.

3. In a machine for lasting shoes, a pair of lasting units adapted to operate at opposite sides of a shoe at the ball region, each unit including grippers for pulling an upper heightwise of a last at the ball region, a clamp arranged to hold the upper against the last after pulling by said grippers, first and second wipers arranged to wipe the upper inwardly over the edge of the last bottom at the ball region, a block carrying the clamps and wipers, means mounting the block for bodily movement widthwise of the last to an extent determined by engagement of the clamps with the upper pulled by the grippers, and means effective after the clamps are engaged with the upper for moving the wipers relatively to the block to wipe the upper from the edge of the last bottom inwardly over the bottom of the last.

4. In a machine for lasting shoes, a pair of lasting units adapted to operate at opposite sides of a shoe at the ball region, each unit including grippers for pulling an upper heightwise of a last at the ball region, a clamp arranged to hold the upper against the last after pulling by said grippers, a first wiper movable inwardly to wipe the upper over the edge of the last bottom at the ball region, and a second wiper movable inwardly to wipe the upper over the edge of the last bottom region that extends heightwise of the last from the ball region toward the heel end of the last, a block carrying the clamps and wipers, means mounting the block for bodily movement widthwise of the last to an extent determined by engagement of the clamps with the upper pulled by the grippers, and means effective after the clamps are engaged with the upper for moving the wipers relatively to the block to wipe the upper from the edge of the last bottom inwardly over the bottom of the last.

5. In a machine for lasting shoes, a pair of lasting units adapted to operate at opposite sides of a shoe at the ball region, each unit including grippers for pulling an upper heightwise of a last at the ball region, a clamp arranged to hold the upper against the last after pulling by said grippers, a first wiper movable inwardly to wipe the upper over the edge of the last bottom at the ball region, and a second wiper movable inwardly to wipe the upper over the edge of the last bottom region that extends heightwise of the last from the ball region toward the heel end of the last, a block carrying the clamps and wipers, means mounting the block for bodily movement widthwise of the last to an extent determined by engagement of the clamps with the upper pulled by the grippers, means effective after the clamps are engaged with the upper for moving the wipers relatively to the block to wipe the upper from the edge of the last bottom inwardly over the bottom of the last, said first wiper having a surface exposed beyond the edge of the last after its inward wiping movement, means mounting the first wipers for yielding movements heightwise of the last, and forepart wipers for wiping the upper around the forepart of the last heightwise and thereafter inwardly over the last bottom, and heelward ends of the forepart wipers being engageable with the exposed surfaces of the first wipers for depressing the first wipers during the heightwise movement of the forepart wipers which during their inward movements overlap those portions of the upper previously wiped by the first wipers.

6. In a machine for shaping uppers over lasts, a pair of wiping units adapted to operate on an upper at opposite sides of a last at the ball regions, each unit including a first wiper arranged to wipe the upper inwardly over the edge of the last bottom at the ball region, and a second wiper arranged to wipe the upper inwardly over the edge of the last bottom region that extends heightwise of the last from the ball region toward the heel end of the last, said first wiper having a surface exposed beyond the edge of the last after its inward wiping movement, means mounting the first wipers for yielding movements heightwise of the last, and forepart wipers for wiping the upper around the forepart of the last heightwise and thereafter inwardly over the last bottom, the heelward ends of the forepart wipers being engageable with the exposed surfaces of the first wipers for depressing the first wipers during the heightwise movement of the forepart wipers which during their inward movements overlap those portions of the upper previously wiped by the first wipers.

7. In a machine for shaping uppers over lasts, a pair of wiping units adapted to operate on an upper at opposite sides of a last at the ball regions, each unit including a first wiper arranged to wipe the upper inwardly over the edge of the last bottom at the ball region, and a second wiper arranged to wipe the upper inwardly over the edge of the last bottom region that extends heightwise of the last from the ball region toward the heel end of the last, said first wiper having a surface exposed beyond the edge of the last after its inward wiping movement, means mounting the first wipers for independent yielding movements heightwise of the last, and forepart wipers for wiping the upper around the forepart of the last heightwise and thereafter inwardly over the last bottom, the heelward ends of the forepart wipers being engageable with the exposed surfaces of the first wipers for depressing the first wipers while the second wipers remain in engagement with the upper during the heightwise movement of the forepart wipers which during their inward movements overlap those portions of the upper previously wiped by the first wipers.

References Cited in the file of this patent

UNITED STATES PATENTS

| | | |
|---|---|---|
| 2,182,834 | Winkley | Dec. 12, 1939 |
| 2,249,635 | Newcomb | July 15, 1951 |
| 2,739,323 | Jorgensen | Mar. 27, 1956 |